United States Patent
Komon et al.

(10) Patent No.: US 10,266,912 B2
(45) Date of Patent: Apr. 23, 2019

(54) PROCESSED SLAG AND METHODS FOR PRODUCING SAME

(71) Applicant: Lixivia, Inc., Santa Barbara, CA (US)

(72) Inventors: Zachary J. A. Komon, San Diego, CA (US); Michael D. Wyrsta, Santa Barbara, CA (US)

(73) Assignee: LIXIVIA, INC., Santa Barbara, CA (US)

( * ) Notice: Subject to any disclaimer, the term of this patent is extended or adjusted under 35 U.S.C. 154(b) by 0 days.

(21) Appl. No.: 15/638,103

(22) Filed: Jun. 29, 2017

(65) Prior Publication Data
US 2017/0298472 A1    Oct. 19, 2017

Related U.S. Application Data

(63) Continuation-in-part of application No. 14/073,503, filed on Nov. 6, 2013, now Pat. No. 9,695,490.

(60) Provisional application No. 61/855,443, filed on May 14, 2013, provisional application No. 61/797,354, filed on Dec. 4, 2012, provisional application No. 61/796,371, filed on Nov. 7, 2012.

(51) Int. Cl.
  *C22B 3/28*   (2006.01)
  *C22B 7/04*   (2006.01)
  *C22B 26/20*  (2006.01)

(52) U.S. Cl.
  CPC ............ *C22B 3/001* (2013.01); *C22B 26/20* (2013.01); *C22B 7/04* (2013.01); *Y02P 10/234* (2015.11)

(58) Field of Classification Search
  CPC .................................................. C22B 3/001
  See application file for complete search history.

(56) References Cited

U.S. PATENT DOCUMENTS

| 5,939,034 A | 8/1999 | Virnig et al. |
| 6,951,960 B2 | 10/2005 | Perraud |
| 2004/0228783 A1 | 11/2004 | Harris et al. |

FOREIGN PATENT DOCUMENTS

| EP | 1309392 B1 | 7/2006 |
| JP | 2005-097072 A | 4/2005 |
| WO | 2012-055750 A1 | 5/2012 |
| WO | 2012-055750 A4 | 7/2012 |

OTHER PUBLICATIONS

Kodama, Satoshi, et al., "Development of a New Ph-Swing CO2 Mineralization Process With a Recyclable Reaction Solution," Energy 33 (2008) 776-784, 9 pages.

*Primary Examiner* — Melissa S Swain
(74) *Attorney, Agent, or Firm* — Fish IP Law, LLP

(57) ABSTRACT

Hydrometallurgical systems, methods, and compositions are described in which organic amine-based lixiviants are utilized in the selective removal of carbonate-forming alkaline earth elements from slag. The resulting processed slag has a reduced tendency to form carbonate salts on environmental exposure, and reduced tendency to fracture due to the formation of such salts. The lixiviant used can be regenerated and recycled for use in subsequent iterations of the process.

16 Claims, 9 Drawing Sheets

| Mineral | Wt. % |
|---|---|
| $SiO_2$ | 11.8 |
| $Al_2O_3$ | 4.9 |
| $Fe_2O_3$ | 29.7 |
| MgO | 9.58 |
| CaO | 35.5 |
| $Na_2O$ | 0.05 |
| $K_2O$ | 0.03 |
| $TiO_2$ | 0.35 |
| $P_2O_5$ | 0.50 |
| MnO | 3.78 |
| $Cr_2O_3$ | 0.25 |
| $V_2O_5$ | 0.15 |

FIG. 5

PROCESSED SLAG AND METHODS FOR PRODUCING SAME

This application is a continuation in part of U.S. patent application Ser. No. 14/073,503, filed Nov. 6, 2013, which claims priority to U.S. Provisional Application No. 61/796,371, filed Nov. 7, 2012; U.S. Provisional Application No. 61/797,354, filed Dec. 4, 2012; and U.S. Provisional Application No. 61/855,443, filed May 14, 2013. These and all other referenced extrinsic materials are incorporated herein by reference in their entirety.

FIELD OF THE INVENTION

The field of the invention is hydrometallurgy, particularly as it is related to the removal or recovery of alkaline earth elements.

BACKGROUND

The following description includes information that may be useful in understanding the present invention. It is not an admission that any of the information provided herein is prior art or relevant to the presently claimed invention, or that any publication specifically or implicitly referenced is prior art.

Slag is a byproduct of metal (for example, iron or steel) recovery from ores, and includes a broad range of non-desired metal oxides and salts in addition to non-metallic components. The vast majority of slags are ferrous slags produced by the iron/steel industry, with approximately 12% of slag resulting from processing of ores to recovery non-ferrous metals such as copper and zinc.

Although considered to be waste material, various uses have been found for slags produced by ore refining processes. For example, when cooled slowly ferrous slags form a vesicular rock-like material (air-cooled blast furnace slag) that can be utilized as load-bearing fills and road bases. Such material can, after crushing and grading, also be utilized as concrete aggregate and/or sand, as a filter medium, or as a component of fiber insulation. If processed using high volume water sprays, such ferrous slags yield a glassy product that is similar to beach sand. Slags processed in this fashion can be used as a partial replacement for Portland cement in concrete, reinforcement of embankments, and for mine backfilling. Some slags are generated by the injection of oxygen into a mixture of molten iron, metal scrap, and flux (typically lime) to provide basic oxygen furnace slag. This cools to form a dense rock-like material that can be blended with other materials to form pavements, used as an aggregate in skid-resistant asphalt, concrete aggregate, and construction fill.

Such slags, however, can include significant amounts of calcium, magnesium, and other elements in the form of hydroxides, oxides, and/or salts that are reactive with water and/or atmospheric carbon dioxide. The resulting formation of carbonate and/or bicarbonate salts can result in fracturing or fragmentation of the slag. This fragmentation, in turn, reduces the utility of the slag in structural materials (such as concrete) and applications (such as fills).

Hydrometallurgy has been used to isolate metals from a variety of minerals, ores, and other sources. Typically, ore is crushed and pulverized to increase the surface area prior to exposure to the solution (also known as a lixiviant). Suitable lixiviants solubilize the desired metal, and leave behind undesirable contaminants. Following collection of the lixiviant, the metal can be recovered from the solution by various means, such as by electrodeposition or by precipitation from the solution.

Previously known methods of hydrometallurgy have several problems. Identification of lixiviants that provide efficient and selective removal of the desired metal or metals has been a significant technical barrier to their adoption in the isolation of some metals. Similarly, the expense of lixiviant components, and difficulties in adapting such techniques to current production plants, has limited their use.

Approaches have been devised to address these issues. United States Patent Application No. 2004/0228783 (to Harris, Lakshmanan, and Sridhar) describes the use of magnesium salts (in addition to hydrochloric acid) as a component of a highly acidic lixiviant used for recovery of other metals from their oxides, with recovery of magnesium oxide from the spent lixiviant by treatment with peroxide. All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply. Such highly acidic and oxidative conditions, however, present numerous production and potential environmental hazards that limit their utility. In an approach disclosed in U.S. Pat. No. 5,939,034 (to Virnig and Michael), metals are solubilized in an ammoniacal thiosulfate solution and removed into an immiscible organic phase containing guanidyl or quaternary amine compounds. Metals are then recovered from the organic phase by electroplating.

A similar approach is disclosed in U.S. Pat. No. 6,951,960 (to Perraud) in which metals are removed from an aqueous phase into an organic phase that contains an amine chloride. The organic phase is then contacted with a chloride-free aqueous phase that removes metal chlorides from the organic phase. Amines are then regenerated in the organic phase by exposure to aqueous hydrochloric acid. Application to alkaline earth elements (for example, calcium) is not clear, however, and the disclosed methods necessarily involve the use of expensive and potentially toxic organic solvents.

In a related approach, European Patent Application No. EP1309392 (to Kocherginsky and Grischenko) discloses a membrane-based method in which copper is initially complexed with ammonia or organic amines. The copper:ammonia complexes are captured in an organic phase contained within the pores of a porous membrane, and the copper is transferred to an removing agent held on the opposing side of the membrane. Such an approach, however, requires the use of complex equipment, and processing capacity is necessarily limited by the available surface area of the membrane.

Methods for capturing $CO_2$ could be used to recover alkaline earth metals, but to date no one has appreciated that such could be done. Kodama et al. (Energy 33 (2008), 776-784) discloses a method for $CO_2$ capture using a calcium silicate ($2CaO.SiO_2$) in association with ammonium chloride ($NH_4Cl$). This reaction forms soluble calcium chloride ($CaCl_2$), which is reacted with carbon dioxide ($CO_2$) under alkaline conditions to form insoluble calcium carbonate ($CaCO_3$) and release chloride ions ($Cl-$).

Kodama et al. uses clean forms of calcium to capture $CO_2$, but is silent in regard to the use of other alkaline earth elements in this chemistry. That makes sense from Kodoma et al.'s disclosure, which notes that a high percentage (approximately 20%) of the $NH_4Cl$ used is lost in the disclosed process, requiring the use of additional equipment to capture ammonia vapor. This loss results in significant process inefficiencies, and raises environmental concerns. Japanese Patent Application No. 2005097072 (to Katsunori and Tateaki) discloses a similar method for $CO_2$ capture, in which ammonium chloride ($NH_4Cl$) is dissociated into ammonia gas ($NH_3$) and hydrochloric acid (HCl), the HCl being utilized to generate calcium chloride ($CaCl_2$) that is mixed with ammonium hydroxide ($NH_4OH$) for $CO_2$ capture.

International Application WO 2012/055750 (to Tavakkoli et al) discloses a method for purifying calcium carbonate ($CaCO_3$), in which impure $CaCO_3$ is converted to impure calcium oxide (CaO) by calcination. The resulting CaO is treated with ammonium chloride ($NH_4Cl$) to produce calcium chloride ($CaCl_2$), which is subsequently reacted with high purity carbon dioxide ($CO_2$) to produce $CaCO_3$ and $NH_4Cl$, with $CaCO_3$ being removed from the solution by crystallization with the aid of seed crystals. Without means for capturing or containing the ammonia gas that would result from such a process, however, it is not clear if the disclosed method can be adapted to an industrial scale.

Thus, there is still a need for a scalable and economical method to reduce the reactivity of slags with water and/or carbon dioxide.

SUMMARY OF THE INVENTION

Inventors have found that removal of carbonate-forming alkaline earth metals from slags produced by industrial processes provides a processed slag with a reduced tendency to form carbonate salts, which in turn provides improved mechanical stability and resistance to fragmentation. Alkaline earth elements are removed selectively using a lixiviant, which can be subsequently regenerated and recycled through the process.

One embodiment of the inventive concept is a method for producing a processed slag, which includes the steps of contacting a slag raw material with a lixiviant (which can include an organic amine cation containing carbon and a counterion), forming the processed slag and a supernatant that includes an uncharged organic amine and a soluble complex of the cation of the alkaline earth element and the counterion. The resulting processed slag is separated from the supernatant, and has a reduced content of the first alkaline earth element relative to the slag. The lixiviant can be regenerated by regenerating the organic amine cation through addition of a precipitant (e.g. carbon dioxide and/or carbonic acid) to the first supernatant, which can also result in precipitation of the alkaline earth element. This regenerated organic amine cation can be subsequently used to treat the slag. In some embodiments pH during regeneration of the organic amine cation is less than about 7, or between 6 and 7. In some embodiments the organic amine has a pKa between 8 and 14. The lixiviant can be formed by adding an acid to the uncharged organic amine in the presence of the slag.

In some embodiments the slag can also include an additional alkaline earth element. In such embodiments the processed slag can be further contacted with a second lixiviant that includes a second organic amine cation and a second counterion. This results in the formation of a second processed slag and a second supernatant that includes an uncharged second organic amine and a complex of the additional alkaline earth cation and the second counterion. In such embodiments the second processed slag has a reduced content of this additional alkaline earth element relative to the slag and/or to the processed slag. The second processed slag is separated from the second supernatant, which can in turn be treated with a second precipitant to regenerate the second organic cation. In some embodiments this second precipitant can be the same species as the precipitant utilized in the initial treatment of the slag.

In an alternative method for producing a processed slag, a slag that includes a first alkaline earth element and a second alkaline earth element is contacted with a lixiviant that includes a first organic amine cation, a second organic amine cation, and a counterion. This results in the generation of a processed slag and a first supernatant. The first supernatant includes an uncharged first organic amine, an uncharged second organic amine, a first complex comprising a first alkaline earth metal cation and the counterion, and a second complex comprising a second alkaline earth metal cation and the counterion. The resulting processed slag has a reduced content of the first alkaline earth element and the second alkaline earth element relative to the slag, and is separated from the first supernatant. The first alkaline earth metal cation is removed from the first supernatant (for example, by the addition of a precipitant) to form a second supernatant, from which the second alkaline earth metal cation is subsequently removed (for example, by the addition of a precipitant). Examples of suitable precipitants include carbon dioxide and carbonic acid. In this process the first organic amine cation and/or the second organic amine cation are regenerated in the second supernatant. In some embodiments the first organic amine cation and the second organic amine cation are the same species; in other embodiments the first organic amine cation and the second organic amine cation are different species.

Another embodiment of the inventive concept is processed slag produced by selective removal of an alkaline earth element from a slag. Such a processed slag can have less than 60%, less than 40%, and/or less than 20% of the first alkaline earth element content of the slag. The processed slag is characterized by having a reduced carbonate content relative to that of the slag following environmental exposure. Similarly, the processed slag is characterized by having improved resistance to compressive stress or lateral stress relative to that of the slag following environmental exposure.

Another embodiment of the inventive concept is a construction material that includes a processed slag produced by selective removal of a first alkaline earth element from a slag. Such a processed slag can have less than 60%, less than 40%, and/or less than 20% of the first alkaline earth element content of the slag. Examples of such construction materials include concrete, concrete sand, concrete aggregate, and asphalt aggregate. Other examples of such construction materials include road bed material, railroad track bed material, and fill material.

Various objects, features, aspects and advantages of the inventive subject matter will become more apparent from the following detailed description of preferred embodiments, along with the accompanying drawing figures.

BRIEF DESCRIPTION OF THE DRAWINGS

FIG. 5 illustrates the composition of a steel slag.

FIG. 7A shows pH changes over time as an alkaline earth element is removed from a low grade source using an organic amine lixiviant. FIG. 7B shows pH changes over time as an alkaline earth element is removed from a low grade source using a different organic amine lixiviant. FIG. 7C shows pH changes over time as an removed alkaline earth element is recovered through the use of a precipitant. FIG. 7C is a photomicrograph of a precipitated calcium carbonate product of systems, methods, and compositions of the inventive concept.

DETAILED DESCRIPTION

Figure 1:
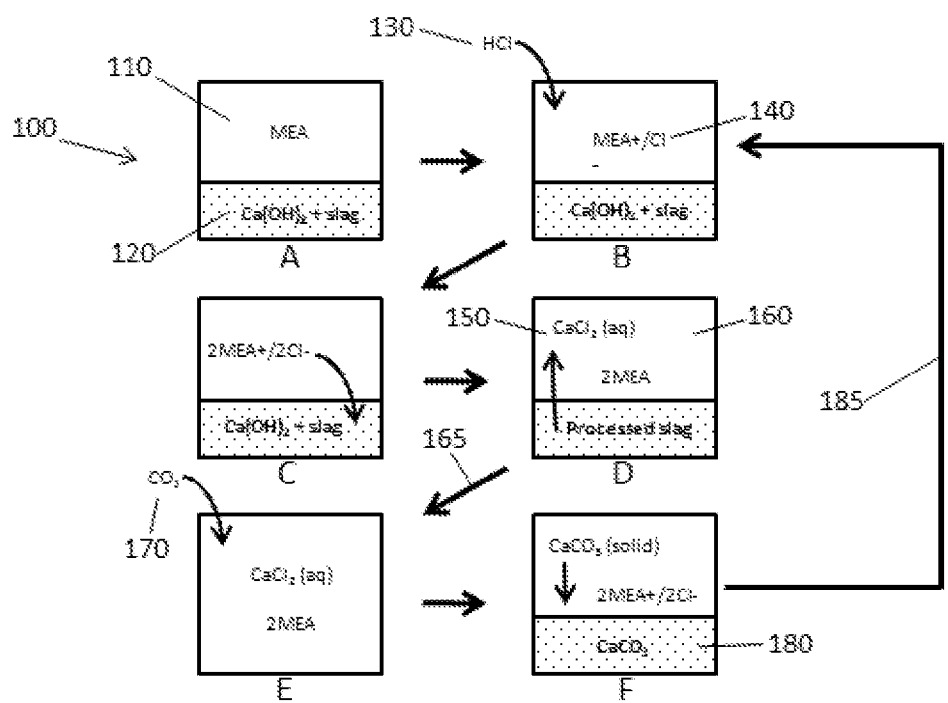
FIG. 1 schematically depicts steps A through F of an example of a method of the inventive concept in which calcium is removed from slag to generate a processed slag, using an organic amine chloride lixiviant that is regenerated.

Throughout the following discussion, numerous references will be made regarding lixiviants. A lixiviant should be understood to be a chemical entity that has the ability to selectively remove metals or metal ions from inorganic or organic solids in an aqueous or other solvent mixture.

The inventive subject matter provides apparatus, systems and methods which provide a processed slag with a reduced tendency to fragment. This is achieved by selective removal of metals (e.g. calcium and/or magnesium) that form carbonates on exposure to water and carbon dioxide. Such removal can be essentially complete (i.e. >90% removal) or partial (i.e. greater than 20%, 25%, 30%, 35%, 40%, 45%, or 50% removal), depending on the composition of the slag and/or duration of treatment. Such processed slags are particularly useful in structural and fill materials as the reduced carbonate content reduces fragmentation and subsequent mechanical destabilization of the particles of processed slag.

Processed slags are generated by subjecting ferrous and/or non-ferrous slag to lixiviant-based processes that selectively remove metals, metal oxides, and/or metal salts that react with components of the environment (such as water and/or carbon dioxide) to for salts that promote fragmentation. The slag is contacted with a lixiviant that selectively solubilizes problematic metallic elements (e.g. calcium and/or magnesium) from the slag, leaving the processed slag as an insoluble material that is readily separated from an aqueous supernatant. Slag can be milled, pulverized, graded, or otherwise re-sized prior to contact with the lixiviant in order to improve reaction kinetics and provide a processed slag having a desired size and/or shape. The lixiviant used in such processes can be regenerated from the soluble, aqueous fraction so generated and re-used, and in some embodiments can be used in small amounts relative to the amount of carbonate-forming metallic element (e.g. calcium and/or magnesium) present in the slag.

The following discussion provides many exemplary embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The inventors have discovered a hydrometallurgical method for the selective removal of alkaline earth elements (i.e., alkaline earth metals), such as members of the alkaline earth family (e.g. calcium and/or magnesium) from slag materials produced by metal ore refining processes, through the use of lixiviants that include organic amines. In addition the inventors have determined that such organic amine-based lixiviants can be regenerated using carbon dioxide.

Embodiments of the inventive process can include at least one compound of the general composition depicted in Compound 1 for use with a slag or other material that contains one or more a form(s) of an alkaline earth (AE) hydroxide forming species, that can be hydrated to form AE(OH)x or other hydrated species that would react with lixiviants of the form found in Equation 1. Alternatively, alkaline earth elements can be presented as oxides, for example calcium oxide (CaO), that can form hydroxides on reaction with water. Such hydrated forms may be present in the material as it is obtained from nature or can be introduced by processing (for example through treatment with a base, hydration, or by oxidation), and can be stable or transient. Selective removal of the desired alkaline earth can be based on the presence of a metal hydroxide that has a stronger basicity than the organic amine-based lixiviants used in the removal process.

Organic amines of the inventive concept have the general formula shown in Compound 1, where N is nitrogen, H is hydrogen, and X is a counterion (i.e., a counter anion).

$$N_y, R_1, R_2, R_3, H—X_z \quad \text{Compound 1}$$

Suitable counterions can be any form or combination of atoms or molecules that produce the effect of a negative charge. Counterions can be halides (for example fluoride, chloride, bromide, and iodide), anions derived from mineral acids (for example nitrate, phosphate, bisulfate, sulfate, silicates), anions derived from organic acids (for example carboxylate, citrate, malate, acetate, thioacetate, propionate and, lactate), organic molecules or biomolecules (for example acidic proteins or peptides, amino acids, nucleic acids, and fatty acids), and others (for example zwitterions and basic synthetic polymers). For example, monoethanolamine hydrochloride (MEA.HCl, $HOC_2H_4NH_3Cl$) conforms to Compound 1 as follows: one nitrogen atom ($N_1$) is bound to one carbon atom ($R_1=C_2H_5O$) and 3 hydrogen atoms ($R_2$, $R_3$ and H), and there is one chloride counteranion ($X_1=Cl-$). Compounds having the general formula shown in Compound 1 can have a wide range of acidities, and an organic amine of the inventive concept can be selected on the basis of its acidity so that it can selectively react with one or more alkaline earth metal salts or oxides from a sample containing a mixture of alkaline earth metal salts or oxides. Such a compound, when dissolved in water or another suitable solvent, can (for example) effectively remove the alkaline earth element calcium presented in the form calcium hydroxide in a suitable sample (e.g. steel slag). Equation 1 depicts a primary chemical reaction in removing an insoluble alkaline earth (AE) salt (in this instance a hydroxide salt) from a matrix using an organic amine cation (OA-H+)/counterion (Cl−) complex (OA-H+/Cl−) as a lixiviant. Note that the OA-H+/Cl− complex dissociates in water into OA-H+ and Cl−.

$$AE(OH)_2(solid)+2\ OA-H+(aq)+2\ Cl-(aq) \rightarrow$$
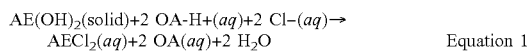
$$AECl_2(aq)+2\ OA(aq)+2\ H_2O \quad \text{Equation 1}$$

The counterion (Cl−) is transferred from the organic amine cation (OA-H+) to the alkaline earth salt to form a soluble alkaline earth/counterion complex ($AECl_2$), uncharged organic amine (OA), and water. Once solubilized the alkaline earth/counterion complex can be recovered from solution by any suitable means. For example, addition of a second counterion (SC) in an acid form (for example. $H_2SC$), which reacts with the alkaline earth cation/counterion complex to form an insoluble alkaline earth salt (AESC), can be used to precipitate the removed alkaline earth from supernatant and release the counterion to regenerate the organic amine cation/counterion pair, as shown in Equation 2.

$$AECl_2(aq)+2\ OA(aq)+H_2SC \rightarrow AESC\ salt(solid)+$$
$$2\ OA+(aq)+2\ Cl- \quad \text{Equation 2}$$

Examples of suitable second counterions include polyvalent cations, for example carbonate (which can be supplied as $CO_2$), sulfate, sulfite, chromate, chlorite, and hydrogen phosphate.

Alternatively, pH changes, temperature changes, or evaporation can be used to precipitate the solubilized alkaline earth. In some embodiments, the alkaline earth element can be recovered by electrodeposition processes, such as electrowinning or electrorefining. In other embodiments of the inventive concept the solubilized alkaline earth element can be recovered by ion exchange, for example using a fixed bed reactor or a fluidized bed reactor with appropriate media.

In a preferred embodiment of the inventive concept, the alkaline earth element can be recovered by precipitation through reaction of the mixture with carbon dioxide ($CO_2$), which advantageously regenerates the lixiviant as shown below. It should be appreciated that the process of recovering the alkaline earth element can be selective, and that such selectivity can be utilized in the recovery of multiple alkaline earth elements from a single source as described below.

The organic amine cation/counterion complex can be produced from the uncharged organic amine to regenerate the OA-H+/Cl− lixiviant, for example using an acid form of the counterion (H—Cl), as shown in Equation 3.

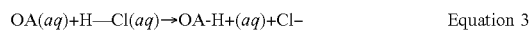
$$OA(aq)+H—Cl(aq) \rightarrow OA-H+(aq)+Cl- \quad \text{Equation 3}$$

In some embodiments of the inventive concept the reaction described in Equation 3 can be performed after the introduction of an uncharged organic amine to a source of an alkaline earth element, with the lixiviant being generated afterwards by the addition of an acid form of the counterion. This advantageously permits thorough mixing of the alkaline earth source with a lixiviant precursor prior to initiating the reaction.

Organic amines suitable for the removal of alkaline earth elements (for example from calcium containing or, steel slag, and other materials) can have a pKa of about 7 or about 8 to about 14, and can include protonated ammonium salts (i.e., not quaternary). Examples of suitable organic amines for use in lixiviants include weak bases such as ammonia, nitrogen containing organic compounds (for example monoethanolamine, diethanolamine, triethanolamine, morpholine, ethylene diamine, diethylenetriamine, triethylenetetramine, methylamine, ethylamine, propylamine, dipropylamines, butylamines, diaminopropane, triethylamine, dimethylamine, and trimethylamine), low molecular weight biological molecules (for example glucosamine, amino sugars, tetraethylenepentamine, amino acids, polyethyleneimine, spermidine, spermine, putrescine, cadaverine, hexamethylenediamine, tetraethylmethylenediamine, polyethyleneamine, cathine, isopropylamine, and a cationic lipid), biomolecule polymers (for example chitosan, polylysine, polyornithine, polyarginine, a cationic protein or peptide), and others (for example a dendritic polyamine, a polycationic polymeric or oligomeric material, and a cationic lipid-like material), or combinations of these. In some embodiments of the inventive concept the organic amine can be monoethanolamine, diethanolamine, or triethanolamine, which in cationic form can be paired with nitrate, bromide, chloride or acetate anions. In other embodiments of the inventive concept the organic amine can be lysine or glycine, which in cationic form can be paired with chloride or acetate anions. In a preferred embodiment of the inventive concept the organic amine is monoethanolamine, which in cationic form can be paired with a chlorine anion.

Such organic amines can range in purity from about 50% to about 100%. For example, an organic amine of the inventive concept can have a purity of about 50%, about 55%, about 60%, about 65%, about 70%, about 75%, about 80%, about 85%, about 90%, about 95%, about 97%, about 99%, or about 100%. In a preferred embodiment of the inventive concept the organic amine is supplied at a purity of about 90% to about 100%. It should be appreciated that organic amines can differ in their ability to interact with different members of the alkaline earth family and with contaminating species, and that such selectivity can be utilized in the recovery of multiple alkaline earths as described below.

Inventors further contemplate that zwitterionic species can be used in suitable lixiviants, and that such zwitterionic species can form cation/counterion pairs with two members of the same or of different molecular species. Examples include amine containing acids (for example amino acids and 3-aminopropanoic acid), chelating agents (for example ethylenediamine-tatraacetic acid and salts thereof, ethylene glycol tetraacetic acid and salts thereof, diethylene triamine pentaacetic acid and salts thereof, and 1,2-bis(o-aminophenoxy)ethane-N,N,N',N'-tetraacetic acid and salts thereof), and others (for example betaines, ylides, and polyaminocarboxylic acids).

Organic amines for use in lixiviants can be selected to have minimal environmental impact. The use of biologically derived organic amines, such as glycine, is a sustainable practice and has the beneficial effect of making processes of the inventive concept more environmentally sound. In addition, it should be appreciated that some organic amines, such as monoethanol-amine, have a very low tendency to volatilize during processing. In some embodiments of the inventive concept an organic amine can be a low volatility organic amine (i.e., having a vapor pressure less than or equal to about 1% that of ammonia under process conditions). In preferred embodiments of the inventive concept the organic amine is a non-volatile organic amine (i.e., having a vapor pressure less than or equal to about 0.1% that of ammonia under process conditions). Capture and control of such low volatility and non-volatile organic amines requires relatively little energy and can utilize simple equipment. This reduces the likelihood of such low volatility and non-volatile organic amines escaping into the atmosphere and advantageously reduces the environmental impact of their use.

An example of an application of the inventive concept is in the selective removal of insoluble calcium hydroxide from slag, using an ammonium chloride containing lixiviant. Any slag or similar industrial waste product that contains a basic form of calcium can be suitable for use in a process of the inventive concept, for example steel slag, iron slag, fly ash, cement kiln dust, ash, shale ash, and acetylene catalyst waste. In preferred embodiments of the inventive concept the slag is a byproduct of the processing of iron/steel ore. Equation 4 represents a reaction that takes place on contacting calcium hydroxide ($Ca(OH)_2$)-containing steel slag with an ammonium chloride lixiviant.

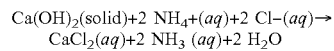

$$Ca(OH)_2(solid)+2\ NH_4+(aq)+2\ Cl-(aq) \rightarrow CaCl_2(aq)+2\ NH_3\ (aq)+2\ H_2O \quad \text{Equation 4}$$

Calcium is removed from the slag as soluble calcium chloride ($CaCl_2$), with the generation of uncharged ammonia ($NH_3$) and water.

A soluble alkaline earth salt, for example calcium chloride and the soluble ammonia from Equation 4 (or soluble ammonium ion if the reaction is metal oxide/hydroxide limited) can easily be separated from the insoluble solid residue, for example by filtration. Once separated, the soluble aqueous fraction can be used as-is if the target process can tolerate the small quantity of ammonia or ammonium chloride. Alternatively, the solution can be further processed as needed. In a preferred embodiment of the inventive concept the lixiviant is regenerated and the alkaline earth calcium is recovered as an insoluble salt through the addition of carbon dioxide ($CO_2$), as shown in Equation 5. Note that aqueous $CO_2$ can be in the form of ionized carbonic acid (i.e., 2H+ plus $CO_3^{2-}$).

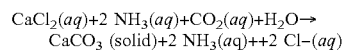

$$CaCl_2(aq)+2\ NH_3(aq)+CO_2(aq)+H_2O \rightarrow CaCO_3\ (solid)+2\ NH_3(aq)++2\ Cl-(aq) \quad \text{Equation 5}$$

It should be appreciated that systems, methods, and compositions of the inventive concept can also be used to selectively remove and/or remove a desired alkaline earth element (such as calcium) from a slag containing other contaminants, for example other alkaline earth elements. By using the lixiviants described herein, one skilled in the art can exploit the varying degrees of basicity associated with each alkaline earth element, and choose a lixiviant of corresponding acidity to achieve selective removal.

As noted above, in many instances the use of a low volatility and/or non-volatile lixiviant is desirable. An example of such a process of the inventive concept is the removal of calcium (Ca) from slag using a non-volatile organic amine, such as monoethanolamine hydrochloride, as shown in steps A to F of FIG. 1A. As shown in step A of FIG. 1, a tank 100 or other suitable arrangement includes an aqueous solution of an organic amine 110 (in this instance monoethanolamine) and a slag 120 containing calcium hydroxide ($Ca(OH)_2$ and unwanted contaminants (CONT). In some embodiments the slag 120 can be milled, ground, pulverized, sieved, or otherwise resized prior to contact with the lixiviant. The solvent used can be any protic or highly polar solvent that can support the solvation of calcium salts in large amounts. Examples of suitable solvents include water, glycerol, and water glycerol mixtures.

The amount of organic amine can be optimized for efficient alkaline earth removal and minimal use of organic amine. For example, in some embodiments the amount of a monovalent organic amine can be selected to be at least about twice that of the available alkaline earth element. In preferred embodiments of the inventive concept the amount of a monovalent organic amine can be selected to be at least about 2.1 times to about 2.05 times that of the available alkaline earth element. Amounts of organic amines with greater charges can be adjusted accordingly (for example, an organic amine that forms a divalent cation can be used in at least a 1:1 ratio with the available alkaline earth element). In other embodiments, the amount of lixiviant species utilized can be less than that of the amount of alkaline earth to be removed from the slag (i.e. present in substoichiometric amounts). In such embodiments the amount of lixiviant present can be selected to be less than about 100%, 95%, 90%, 80%, 70%, 60%, 50%, 40%, 30%, 20%, 15%, 10%, 5%, 3%, 1%, 0.5%, or 0.1% of the alkaline earth species present in the slag on a molar basis.

Reaction conditions can additionally be optimized by adjusting the surface area available for the reaction. Particle size of the calcium containing raw material can be reduced prior to exposure to lixiviant, for example by grinding, milling, or sifting. In some embodiments of the inventive concept the particle size can range from about 0.05 mm to about 1 mm. In other embodiments of the inventive concept the particle size can range from about 0.05 to about 0.25 mm. In a preferred embodiment the particle size can range from about 0.05 mm to about 0.125 mm.

The calcium content of the aqueous solution phase can also be adjusted to provide efficient removal. In some embodiments of the inventive concept the Ca content is controlled such that the mass ratio of Ca (in terms of CaO to water) can range from about 0.02 to about 0.5. In other embodiments the mass ratio of Ca can range from about 0.05 to about 0.25. In a preferred embodiment of the inventive process the mass ratio of Ca can range from about 0.1 to about 0.15.

The removal process can be initiated as shown in step B of FIG. 1 by the addition of an acid form of a counterion 130, in this instance hydrochloric acid (HCl), which generates an organic acid cation/counterion pair 140 (in this instance monoethanolamine hydrochloride (MEA+/Cl−)) to form a lixiviant solution. Monoethanolamine hydrochloride (MEA.HCl, $HOC_2H_4NH_3Cl$) conforms to Compound 1 as follows: one nitrogen atom ($N_1$) is bound to one carbon atom ($R_1=C_2H_5O$) and 3 hydrogen atoms ($R_2$, $R_3$ and H), and there is one chloride counteranion ($X_1=Cl-$). The removal process can be performed at any temperature suitable to support solvation of the alkaline earth salt formed by reaction with the organic amine cation/counterion pair. In some embodiments of the inventive concept the removal can be performed in a temperature range of about 0° C. to about 120° C. In other embodiments of the inventive concept the removal can be performed within a temperature range of about 20° C. to about 100° C. In a preferred embodiment of the inventive concept the removal can be performed within a temperature range of about 20° C. and about 70° C., advantageously reducing the need for temperature control equipment.

As shown in step C of FIG. 1 the lixiviant can enter or mix with the slag and, as shown in step D of FIG. 1, effectively remove an alkaline earth hydroxide, for example calcium hydroxide ($Ca(OH)_2$), by the formation of a soluble alkaline earth cation/counterion pair 150 (in this instance, calcium chloride ($Ca(Cl)_2$)). The reaction can be stirred during the removal process in order to improve reaction kinetics. In some embodiments stirrer speeds can range from about 100 rpm to about 2000 rpm; in other embodiments of the inventive concept stirrer speeds can range from about 200 rpm to about 500 rpm. Equation 6 depicts a critical chemical reaction in such a removal (in this case calcium, from steel slag that contains contaminants). Note that MEA.HCl dissociates in water into monoethanolammonium cation ($HOC_2H_4NH_3+$(MEAH+)) and chloride anion (Cl−). Reaction products include soluble $CaCl_2$ and uncharged monoethanolamine (MEA)).

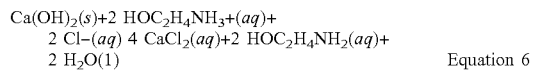

Equation 6

The removal process can be performed for any suitable length of time, as defined by the amount and quality of the material to be processed and the degree of carbonate forming metallic element removal desired. In some embodiments of the inventive concept the removal can be performed for 0.5 hours to 24 hours. In other embodiments the removal can be performed for about 30 minutes. In preferred embodiments of the inventive concept the removal can be performed for about 15 minutes. Depending in part on the organic amine species used in the lixiviant, the pH of the solution can change during the removal process, for example increasing as the alkaline earth element is removed from the slag. In some embodiments of the inventive concept the pH of the solution at the beginning of the removal can range from about 6 to about 13. In other embodiments of the inventive concept the pH at the end of the removal step can range from about 10 to about 12.

Removal of a carbonate forming metallic element with a lixiviant leaves insoluble processed slag which has improved mechanical properties, owing to the lack of metals that form relatively mechanically unstable carbonate salts upon environmental exposure. This can be recovered by a variety of means, including settling, centrifugation, and filtration, as in 165 of step D in FIG. 1. In preferred embodiments of the inventive concept insoluble processed slag is removed by filtration, for example in a filter press that produces a filter cake. In order enhance the efficiency of the process, a filter cake from such a filtration can be washed to remove additional calcium. In some embodiments the filter cake can be treated with a wash volume that is about 10 times that of the wetness of the filter cake. In preferred embodiments of the inventive process lower volumes can be used, for example about 5 times that of the wetness of the filter cake or about 3 times that of the wetness of the filter cake.

Following separation of the soluble aqueous fraction or supernatant from the processed slag 165, the lixiviant can be regenerated and the solubilized alkaline earth element removed from solution by the addition of a precipitant 170, for example carbon dioxide ($CO_2$), as shown in steps E and F of FIG. 1. The precipitant acts to form an insoluble salt with the alkaline earth element (see step E of FIG. 1). Surprisingly, inventors have found that $CO_2$ precipitation of alkaline earth chlorides (for example, $CaCl_2$) can proceed efficiently at an acidic pH (i.e., pH<7). Addition of $CO_2$ also generates the organic amine cation/counterion pair, as shown in step F of FIG. 1 and in Equation 7, thereby regenerating the lixiviant.

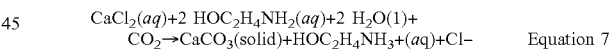

Equation 7

In the exemplary reaction the precipitant forms calcium carbonate ($CaCO_3$) 180 which, being relatively insoluble, can be easily recovered for additional processing and, if desired, recovery of calcium. For example, $CaCO_3$ can be recovered using a filter press, as described above. The regenerated lixiviant can be recycled into the process 185, advantageously reducing the overall need for lixiviant and increasing process efficiency as more slag is processed.

The precipitation reaction can be performed at any temperature suitable to support the solubility of the precipitating agent (for example, $CO_2$) and maintain the insolubility of the precipitated salt. In some embodiments of the inventive concept the precipitation reaction can be performed at about 4° C. to about 100° C. In other embodiments the precipitation reaction can be performed at about 20° C. to about 80° C. In preferred embodiments of the inventive concept the precipitation can be performed at about 40° C. to about 80° C. The concentration of $CO_2$ gas supplied can range from about 0.1% to about 100%. In some embodiments of the inventive concept the concentration of $CO_2$ gas can range from 10% to about 100%. This advantageously permits relatively low quality sources of $CO_2$, for example flue gas or other waste gases, to be utilized. The $CO_2$-containing gas can be applied at any rate suitable for conversion of essentially all of the calcium present to $CaCO_3$ within a suitable time, for example about 3 hours to about 4 hours. Suitable flow rates can range from 1 L/hour/mol Ca to about 100 L/hr/mol Ca. In preferred embodiments of the inventive concept the flow rate for $CO_2$ containing gas can be about 10 L/hour/mol Ca to about 20 L/hour/mol Ca. The pH of the solution can change during the precipitation reaction.

The pH of a working solution can change during the precipitation step. In some embodiments of the inventive concept, the starting pH of the solution can range from about 9 to about 12, and can range from about 6 to about 8 at the end of the precipitation. Advantageously, this pH shift can be monitored to provide an indication of the progress of a precipitation reaction. Surprisingly, inventors have found that such a $CO_2$ precipitation of alkaline earth chlorides (for example, $CaCl_2$) in this process can proceed efficiently at an acidic pH (i.e., pH<7). The precipitation reaction can be performed until a suitable endpoint is reached. For example, in some embodiments the precipitation can be performed until the pH of the reaction remains below a specified setpoint (for example, a pH of about 8) for at least about 15 minutes.

Separation of a precipitated alkaline earth (e.g. calcium and/or magnesium) can be accomplished by any suitable method, including removing the soluble aqueous fraction from the tank 100 (for example, by decanting, pumping, or siphoning), filtration, centrifugation, or a combination of these. In a preferred embodiment the precipitate is removed using a filter press. The resulting filter cake can be easily recovered for additional processing and, if desired, recovery of calcium. The regenerated lixiviant can be recycled into the next iteration of the process 185, advantageously reducing the overall need for lixiviant and increasing process efficiency as more raw materials containing alkaline earths are processed.

It should be noted that the choice of lixiviant can allow for the selective removal of calcium in this example because it does not react with other metals (ME) or metal oxides/hydroxides ($MEO_x$) in the slag, as shown in Equation 8 and Equation 9.

ME(s)+$HOC_2H_4NH_3$+(aq)→NO REACTION   Equation 8

$MEO_x$(s)+$HOC_2H_4NH_3$+(aq)→NO REACTION   Equation 9

The soluble calcium salt and the soluble MEA from Equation 6 can easily be separated from the processed slag. Once separated, the soluble aqueous fraction can utilized in other processes as-if, providing the target process can withstand the small quantity of lixiviant as a contaminant. Alternatively the soluble aqueous fraction can be furthered processed as needed.

In an alternative embodiment of the inventive concept, a soluble aqueous fraction containing a solubilized alkaline earth cation/counterion complex as shown in Equation 6 can be concentrated or diluted to a desired strength as required by the end user. Alternatively, such a solution can be boiled down or evaporated completely, leaving an alkaline earth element cation/counterion salt and/or various hydrates thereof, depending on how vigorously the mixture is dried. The residual uncharged organic amine could also be removed by this process and optionally captured for reuse. The dried alkaline earth element chlorides can be further processed into oxides via thermal oxidation, precipitation with agents such oxalic acid, sodium hydroxide, potassium hydroxide or other precipitating agents.

There are of course many possible lixiviants of the form of Compound 1, and there are likewise many alkaline earth element sources. While the examples provided have described the action of two organic amine lixiviants (i.e., ammonium chloride and monoethanolamine hydrochloride (a.k.a. monoethanolammonium chloride) with one particular source (steel slag) of a particular alkaline earth element (calcium) other examples of process of the inventive concept can utilize organic amine cation/counterion pairs such as ammonium acetate, monoethanol-ammonium acetate, ammonium nitrate, or monoethanolammonium nitrate. Alternatively, biologically derived lixiviants such as the amino acid glycine (or a salt of itself) or the hydrobromide salt of poly-L-lysine can be used. Similarly, while examples note the use of steel slag, other sources (such as calcite, dolomite, gypsum, plagioclases, amphiboles, pyroxenes and garnets) are suitable. Alternatively, systems, methods, and compositions of the inventive concept can be utilized to recover alkaline earth elements from agricultural waste, consumer waste, industrial waste, scrap or other excess materials from manufacturing processes, or other post-utilization sources.

Many alkaline earth elements can form hydroxides; most of these have very limited solubility in water. These hydroxides also have varying degrees of basicity. While calcium hydroxide present in many industrial slags has been cited as an example there are many other alkaline earth elements that form suitable bases in water and can be problematic if present in significant quantities in a processed slag. Examples of such other elements include magnesium, beryllium, strontium, barium, and radium. Such salts have different basicities, which can be paired with organic amine based lixiviants of different acidities to provide selective recovery.

It should also be noted that systems, methods, and compositions of the inventive concept are not limited to one alkaline earth species being removed with one particular lixiviant or set of anions. Multiple alkaline earth species with various organic amine based lixiviants and various anions (or acids) can be used in sequence or in parallel to remove a particular mixture of metals or to produce a processed slag having a particular composition.

As described above, lixiviants of the inventive concept can be applied in a variety of methods. Examples of some of these methods are depicted schematically in FIG. 2, FIG. 3, and FIG. 4.

Figure 2:
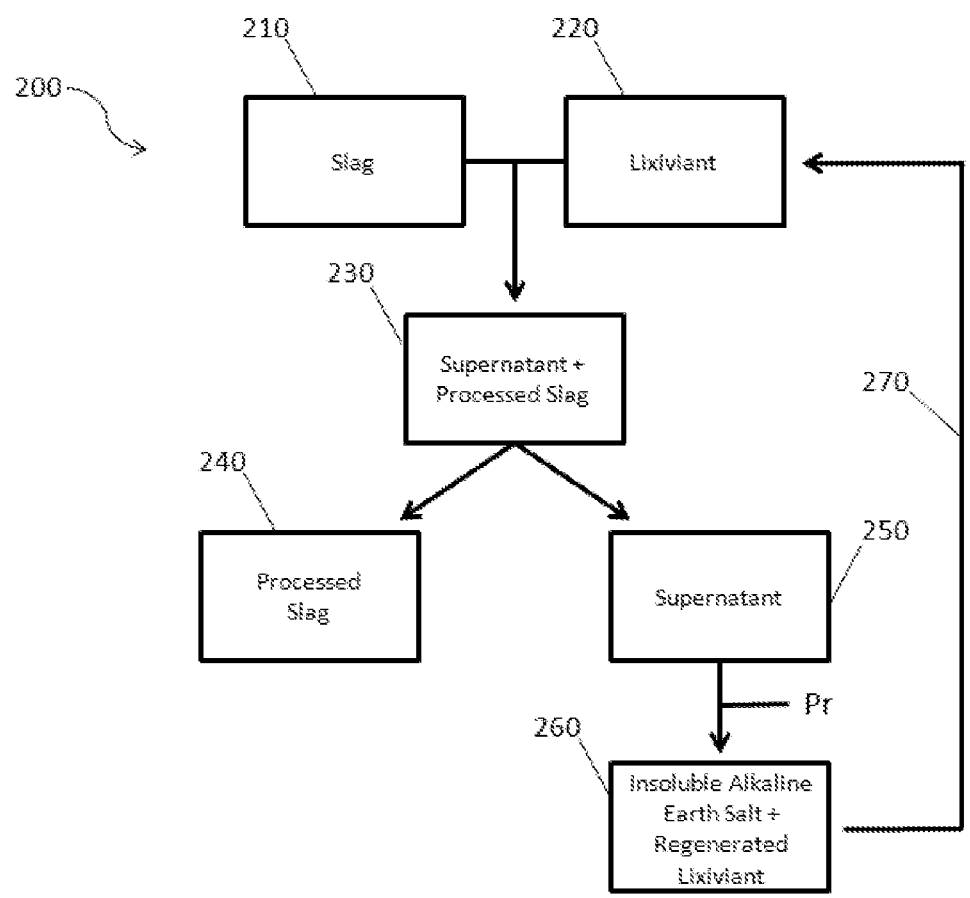
FIG. 2 schematically depicts a method of the inventive concept, in which an alkaline earth element is removed from slag using a lixiviant to produce a processed slag. The lixiviant is subsequently regenerated.

FIG. 2 depicts a method of the inventive process 200 in which a slag 210, for example an iron/steel slag containing an alkaline earth element, is mixed with a lixiviant 220. The lixiviant can include one or more organic amine species as described above in the form of a cation, coupled with a suitable counterion. Suitable counterions can include halides. In a preferred embodiment of the inventive concept the counterion is chloride (Cl−).

A sample 210 can be a calcium-containing iron/steel slag or any suitable slag or other industrial waste that includes a carbonate-forming alkaline earth (e.g. calcium and/or magnesium). The slag 210 can be treated prior to mixing with the lixiviant 220. For example, the components of the sample 210 can be reduced in size, for example through milling, grinding, pulverizing, or sifting. Such processes improve the surface area to volume ratio of elements of the slag and can serve to increase reaction rates and/or efficiency of removal of carbonate forming metals and salts. In some embodiments a slag can be chemically treated, for example through exposure to strong bases (such as sodium hydroxide) or oxidized through exposure to air at elevated temperatures. Such chemical treatments can serve to generate alkaline earth metal salts (for example, hydroxides or oxides) and to alter the physical structure of the slag or components of the slag.

On interacting with the lixiviant 220, alkaline earth elements in the slag interact with organic amine cations and counterions to form a soluble alkaline earth element cation/counterion complex that is solubilized in the aqueous supernatant 230, along with an uncharged organic amine. The pH of this portion of the reaction process can be alkaline (i.e., ranging from about 7.5 to about 14). In some embodiments of the inventive concept the pH can range from about 10 to about 12. Slag from which such alkaline earth elements have been extracted remains behind as insoluble material, for example as a processed slag 240 that can be utilized for various construction material and/or fill purposes or further processed if desired.

The processed slag 240 can be separated from the aqueous supernatant 250 by a variety of processes, including settling, filtration, or centrifugation, either alone or in combination. If desired, the alkaline earth cation 260 can be recovered from the aqueous supernatant 250 by any suitable means, including electrodeposition, precipitation, and ion exchange. In a preferred embodiment of the inventive concept the lixiviant species is regenerated by the addition of a precipitant (Pr) to produce an insoluble alkaline earth salt, which can be readily recovered if so desired. Such precipitants can be an H+ donating species suitable for forming insoluble salts of alkaline earth elements while regenerating an organic amine cation, for example $CO_2$ or carbonic acid, chromic acid, or sulfuric acid. In a preferred embodiment of the inventive concept the precipitant (Pr) is $CO_2$ or carbonic acid. Surprisingly, inventors have found that this precipitation can be performed at a pH of less than 7. In such an embodiment a precipitation step can be performed at a pH between about 6 and about 7. In a preferred embodiment a precipitation step can be performed at a pH of about 6.7. As noted above, the uncharged organic amine remaining in the supernatant 250 is regenerated 270 in this process to form an organic amine cation that can form part of a lixiviant 220 that can be used in the next iteration of the reaction. This recycling of the lixiviant greatly reduces consumption through multiple cycles of the process and advantageously reduces environmental impact and expense.

Figure 3:
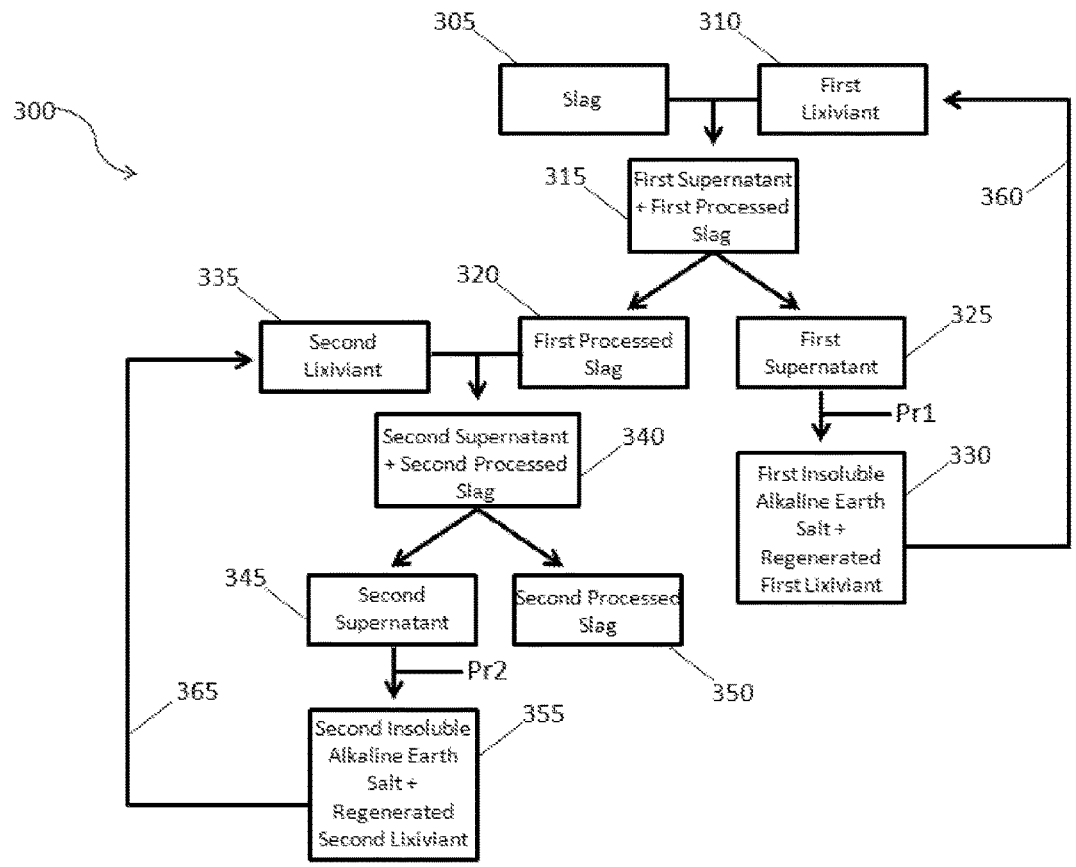
FIG. 3 schematically depicts another method of the inventive concept, in which different alkaline earth elements are removed from slag in a stepwise fashion to produce a processed slag.

Other embodiments of the inventive concept can advantageously utilize the selective complex formation and solubility of components of methods of the inventive concept to remove different alkaline earth elements from the same slag. One example of such a method is shown in FIG. 3. As shown, such a method can be a chain of reactions that are, essentially, one or more repetitions of the method shown in FIG. 1 applied to a progressively depleted slag. In an example of such a method 300, a slag 305 and a first lixiviant 310 are brought into contact with each other. The first lixiviant 310 includes a first organic amine cation and a counterion, and reaction 315 with the slag 305 produces a first processed slag 320 and a first aqueous supernatant 325 that includes a first alkaline earth cation, a counterion, and an uncharged organic amine. The first processed slag 320 includes materials that were not reactive with the first lixiviant, which can include additional alkaline earth elements, potentially valuable materials, and unwanted contaminants. The first process slag 320 can be separated from the first aqueous supernatant 325 by any suitable method, including settling, filtration, and centrifugation, either alone or in combination. If desired, the first alkaline earth cation can be recovered from the first supernatant 325 by any suitable means, including electrodeposition, precipitation, and ion exchange. In a preferred embodiment of the inventive concept a first precipitant (Pr1) can used that generates an insoluble first alkaline earth salt and regenerates the first organic amine cation/counterion pair 330. In such an embodiment the uncharged first organic amine remaining in the aqueous supernatant 325 can, in turn, be regenerated 360 to give a first organic amine cation that can form part of a first lixiviant 310 that can be used in the next iteration of the process.

The first processed slag 320 can, in turn, be contacted 340 with a second lixiviant 335 that includes a second organic amine cation/counterion pair. Reaction with the first processed slag 240 produces a second processed slag 350 and a second aqueous supernatant 345 that includes a soluble second alkaline earth element cation/counterion complex and uncharged second organic amine. If so desired, the second alkaline earth cation can be recovered from the second aqueous supernatant 345 by any suitable means, including precipitation, electrodeposition, and/or ion exchange. In a preferred embodiment of the inventive concept a second precipitant (Pr2) can used that generates an insoluble second alkaline earth salt and regenerates the second organic amine cation/counterion pair 355.

Such precipitants can be an H+ donating species suitable for forming insoluble salts of alkaline earth elements while regenerating an organic amine cation, for example $CO_2$ or carbonic acid, chromic acid, or sulfuric acid. The regenerated second organic amine/counterion pair can in turn be recycled 365 for use in the next iteration of the process. In some embodiments of the inventive concept the first precipitant and the second precipitant are the same species. In other embodiments of the inventive concept the first precipitant and the second precipitant are different species. In a preferred embodiment of the inventive concept the first precipitant and the second precipitant are $CO_2$ or carbonic acid. In some embodiments of the inventive concept the second processed slag 350 is subjected to further rounds of treatment with lixiviants in order to remove additional carbonate-forming metallic elements. This recycling of the lixiviants advantageously reduces the overall amount of organic amines used as the process is repeated, which limits both the environmental impact of such operations and permits considerable savings in materials.

Figure 4:
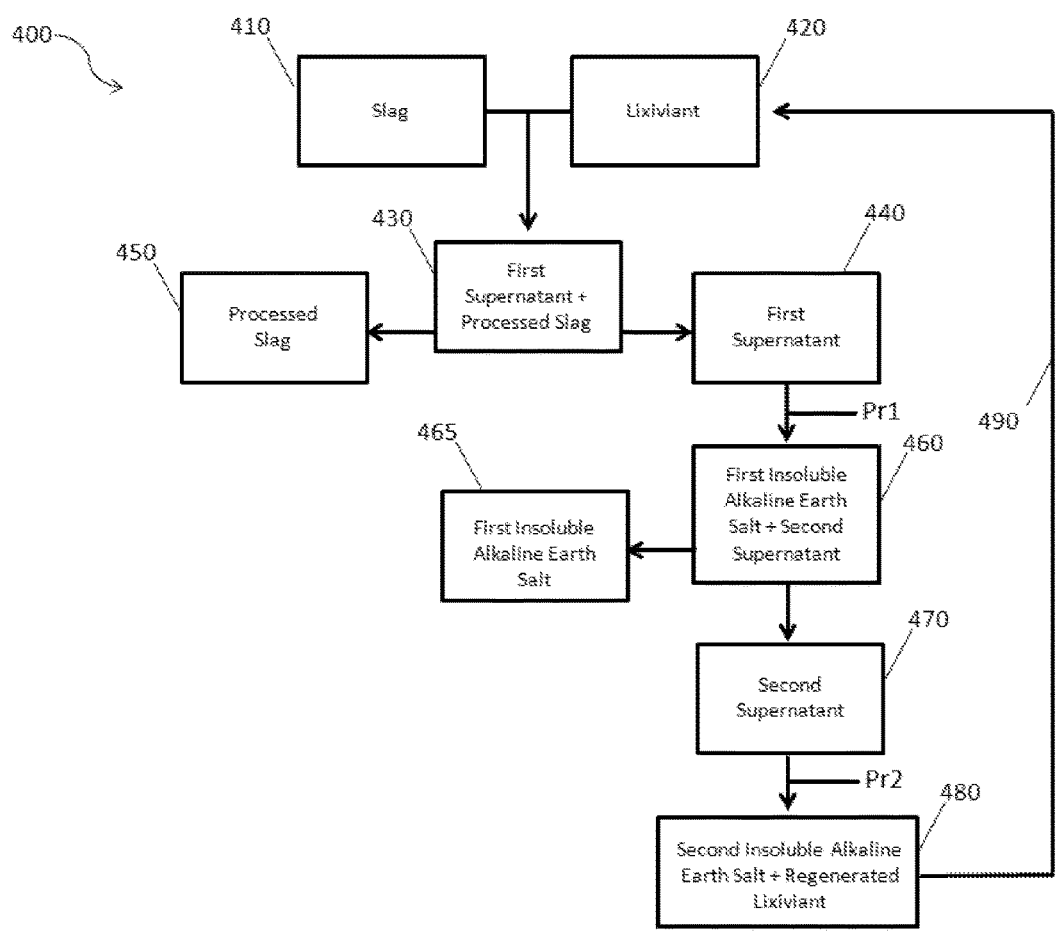
FIG. 4 schematically depicts an alternative embodiment of the inventive concept, in which different alkaline earth elements are removed from slag to produce a processed slag.

Another embodiment of the inventive concept that permits removal of two or more alkaline earth elements from a slag is shown in FIG. 4. In such a method 400 a slag 410 is contacted with a lixiviant 420 that includes a first organic amine cation/counterion pair and a second organic amine cation/counterion pair. This mixture 430 results in a processed slag 450 and a first aqueous supernatant 440. This first aqueous supernatant can include a first alkaline earth element cation/counterion pair, a second alkaline earth element cation/counterion pair, a first uncharged organic amine, and a second uncharged organic amine. If desired, the first alkaline earth cation 460 can be recovered from the first aqueous supernatant 440 by any suitably selective means, including precipitation, electroplating, or ion exchange. In some embodiments of the inventive concept, the first alkaline earth element can be recovered by adding a first precipitant (Pr1) that selectively forms an insoluble salt of the first alkaline earth element 460. For example, in a slag that contains magnesium and calcium, the calcium can be removed and optionally recovered in this step of the reaction by the addition of chromic acid as a first precipitant (P1) to form relatively insoluble calcium chromate ($CaCrO_4$); relatively soluble magnesium chromate ($MgCrO_4$) would remain in a second aqueous supernatant 470.

Recovery of the second alkaline earth cation from the second supernatant 470 also yields a regenerated lixiviant. If desired, the second alkaline earth cation can be recovered from the second supernatant 470 by any suitable means, such as precipitation, electrodeposition, or ion exchange. In some embodiments the second alkaline earth element can be recovered by adding a second precipitant (Pr2) that forms an insoluble salt of the second alkaline earth element and completes regeneration of the lixiviant 480. For example, in a sample containing a mixture of magnesium and calcium, the magnesium can be recovered in this step of the reaction from a supernatant resulting from chromic acid treatment by the addition of $CO_2$ or carbonic acid as a second precipitant (P2) to form relatively insoluble calcium carbonate ($CaCO_3$). The regenerated lixiviant can in turn be recycled 490 in the next iteration of the process.

In some embodiments of the inventive concept the first organic amine and the second organic amine (and their respective cations) can be different molecular species with different acidities and/or specificities for alkaline earth elements. In other embodiments of the inventive concept the first organic amine and the second organic amine can be the same molecular species, with selectivity between the first alkaline earth element and the second alkaline earth element being provided by the method used for their recovery from supernatants. For example, utilization of different precipitating species, utilization of the same precipitating species under different conditions (for example, concentration, temperature, pH, or a combination of these), utilization of ion exchange media with different selectivities, or combinations of these approaches can be used to provide selective recovery of the alkaline earth elements of a sample. It should be appreciated that, as described in the processes illustrated in FIG. 2 and FIG. 3, that regeneration and re-use of the lixiviant through repeated iterations advantageously reduces the amount of organic amine needed, which limits both the environmental impact of such operations and permits considerable savings in materials.

Another embodiment of the inventive concept is a processed slag with reduced content of carbonate-forming metallic elements relative to a slag starting material. Such a processed slag can be produced by selective removal of carbonate-forming metallic elements (such as calcium and/or magnesium) from a slag raw material by one or more of the processes described above. Such a processed slag has a reduced tendency to form carbonates on exposure to air and moisture. Since formation of such carbonates leads to expansion and fracturing of slag materials the processed slag exhibits improved mechanical and/or physical stability (e.g. increased resistance to lateral stress, increased resistance to compressive stress, reduced degree of fragmentation over time, etc.) relative to the untreated slag raw material and is better suited for use in construction materials and/or in a load bearing capacity (e.g. in a fill). In some processed slags removal of one or more carbonate-forming metallic elements (e.g. calcium and/or magnesium) is nearly (i.e. greater than 90%) complete. In other processed slags the removal of one or more carbonate-forming metallic elements is partial (i.e. greater than 10%, 20%, 30%, 40%, 50%, or more), but nevertheless sufficient to provide improved mechanical and/or physical characteristics relative to the corresponding untreated slag raw material.

Another embodiment of the inventive concept is a construction and/or paving material produced using a slag material processed to remove at least a portion of carbonate-forming metallic elements found in a corresponding untreated slag. Examples of such construction and/or paving materials include concrete, concrete aggregate, concrete sand, cinder blocks, asphalt aggregates, road bed materials, railroad bed materials, and fills. Other embodiments of the inventive concept include filtration materials and agricultural supplements (e.g. mineral supplements) produced using a processed slag of the inventive concept and having a reduced content of carbonate-forming metallic elements relative to a slag starting material.

Figure 6:
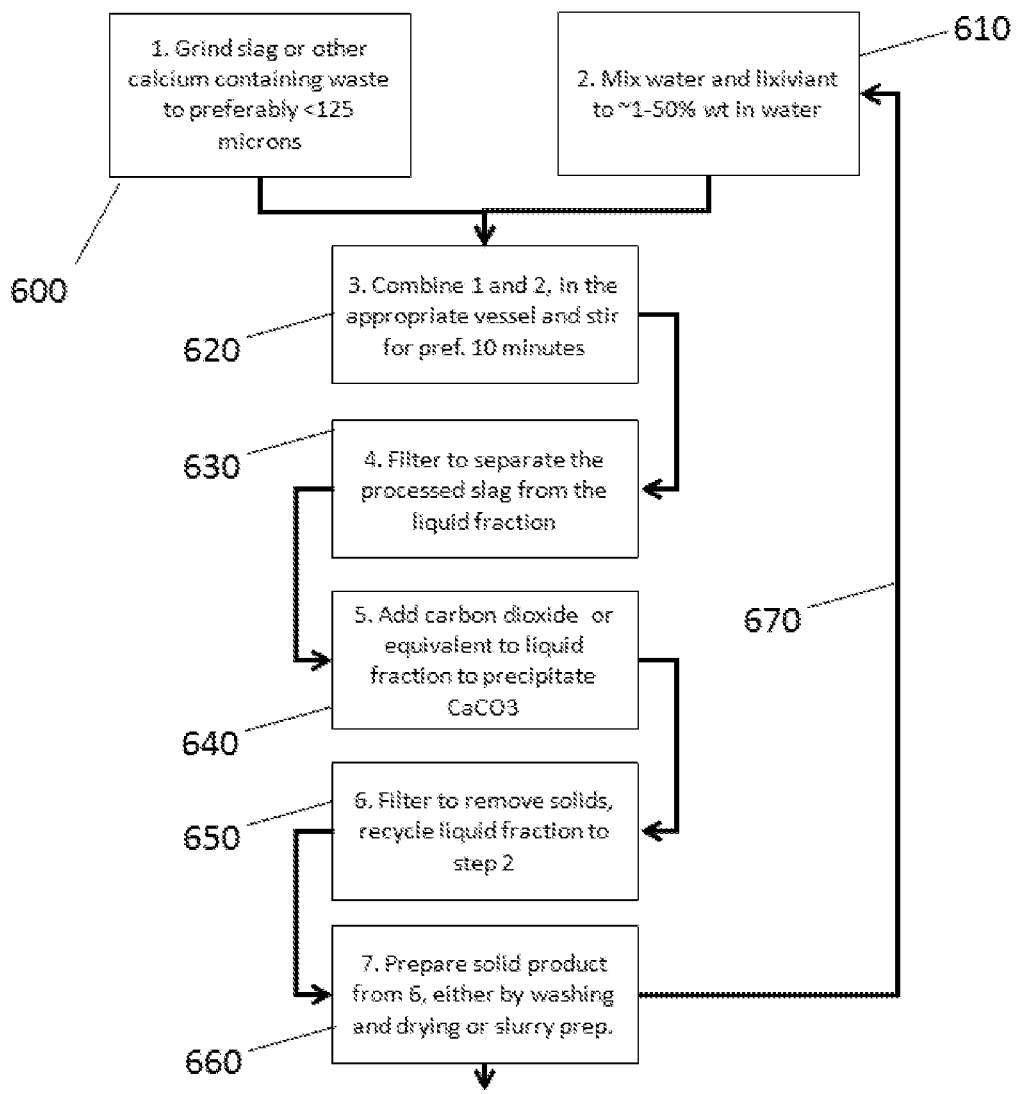
FIG. 6 schematically depicts processing of a steel slag by a method of the inventive concept.

A specific example of the removal of calcium from steel slag is shown in FIG. 5 and FIG. 6. FIG. 5 shows the composition of a typical steel slag, showing a complex mixture of various metal oxides including calcium oxide (CaO), which becomes calcium hydroxide ($Ca(OH)_2$) on exposure to water. Processing of such a steel slag is shown diagrammatically in FIG. 6. Initially, steel slag (or an alternative calcium source) is ground 600 to less than around 125 μm. This greatly increases the surface area available for reaction. Water and lixiviant are mixed 610 in a suitable ratio, which can range from 1% to about 50%. The ground slag and aqueous lixiviant are mixed 620 and stirred or agitated for a time sufficient to form the calcium cation/counterion pair, in this instance approximately 10 minutes. The processed slag, which is depleted of calcium, is removed by filtration 630 and the liquid fraction or supernatant is processed by adding carbon dioxide (or an equivalent, such as carbonic acid) to precipitate calcium carbonate ($CaCO_3$) 640. This process also regenerates the lixiviant. The $CaCO_3$ can then be prepared for further processing by washing, dilution into a slurry, and so on 660, while the regenerated lixiviant is recycled for re-use in the next iteration of the process 670.

Figure 7A:
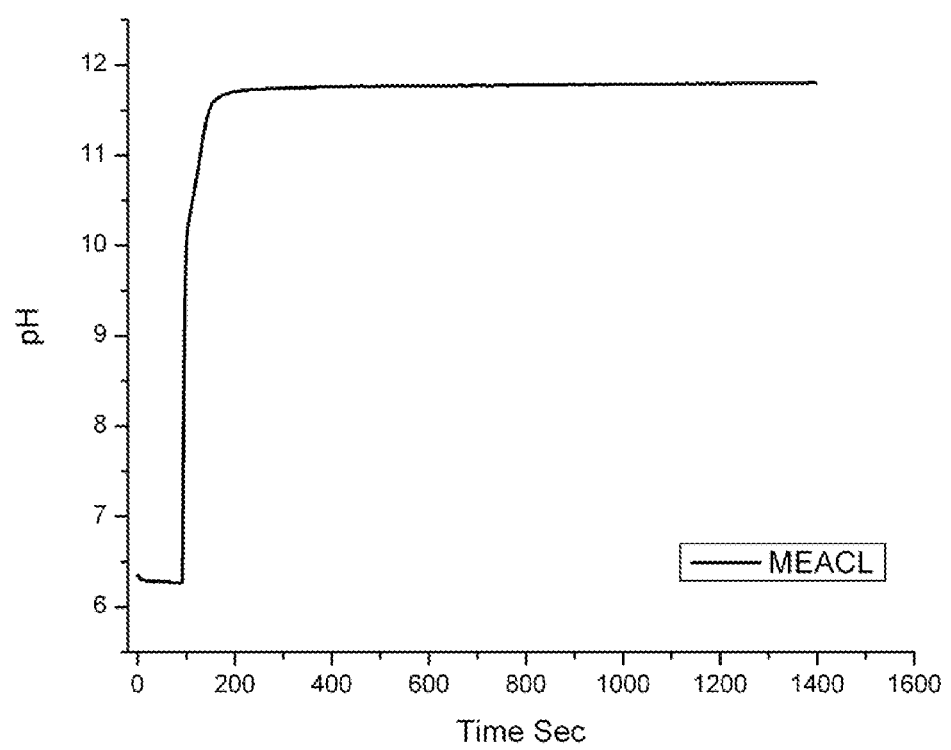
FIG. 7A-C show the results of systems, methods, and compositions of the inventive concept.
Figure 7B:
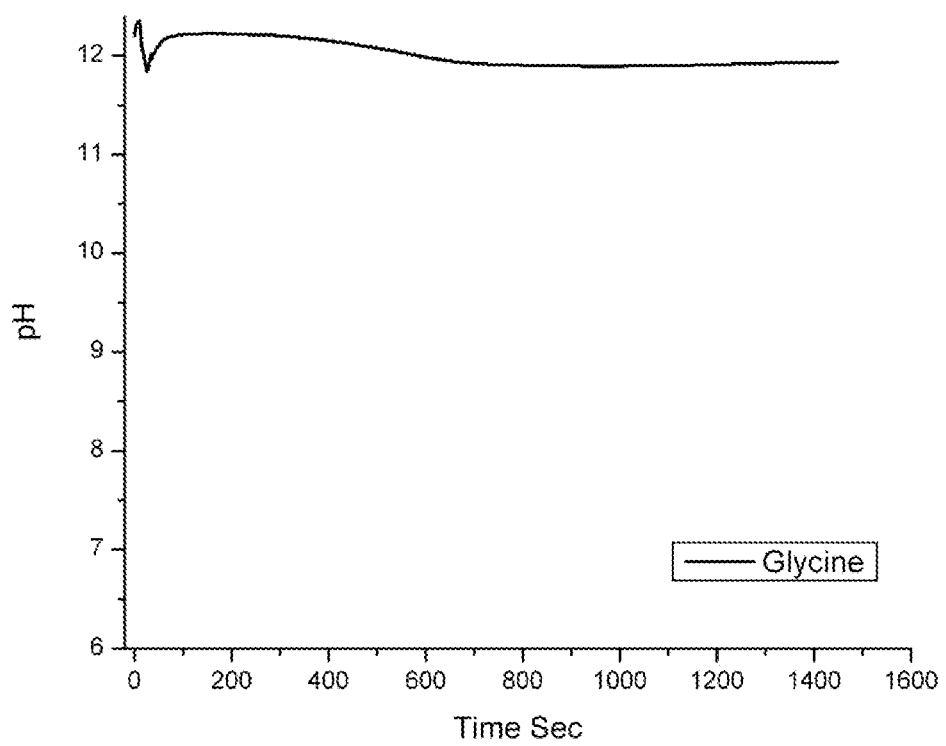
Figure 7C:
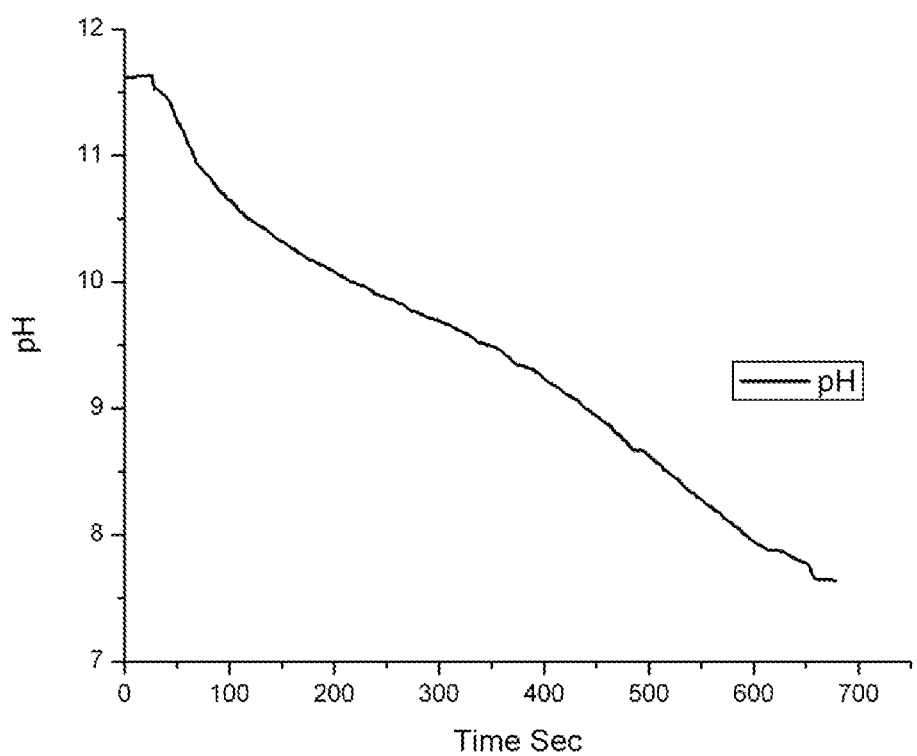

Examples of the recovery of calcium by systems, methods, and compositions of the inventive concept are shown in FIG. 7A through FIG. 7D. FIG. 7A shows the change in pH over time as calcium is removed from low-grade lime using monoethanolamine-HCl (MEACL) as the organic amine lixiviant. In this reaction 5 grams of low-grade lime was mixed with 50 grams of water containing the lixiviant at a lixiviant to calcium molar ratio of 2.1:1, while stirring 400 rpm. The reaction was allowed to proceed for 23 minutes. FIG. 7B shows the results of a similar study, in which the pH was monitored over time as calcium is removed from low-grade lime using glycine as the organic amine lixiviant. It should be appreciated that as an amino acid glycine can be advantageously derived from biological sources and that, due to its zwitterionic nature, glycine can act as its own counterion. In this reaction 5 grams of low-grade lime was mixed with 50 grams of water containing the lixiviant at a lixiviant to calcium molar ratio of 2.1:1, while stirring at 400 rpm. The reaction time was allowed to proceed for 24 minutes. FIG. 7C shows the results of recovery of removed calcium using a precipitant, in this instance $CO_2$. In this example pH was monitored as $CO_2$ was perfused through calcium removed from low grade lime using monoethanolamine-HCl as the lixiviant. The reaction was performed for 11 minutes as 100% $CO_2$ was perfused through the solution at 20 mL per minute at a temperature of 22° C., while stirring at 400 rpm.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method for producing a processed slag, comprising:
    contacting a slag with a first lixiviant, the first lixiviant comprising a first organic amine cation and a first counterion, wherein the slag comprises a first alkaline earth element;
    forming a first processed slag and a first supernatant comprising a first uncharged organic amine, and a first soluble complex comprising a cation of the first alkaline earth element and the first counterion, wherein the first processed slag has a reduced content of carbonate-forming metal relative to the slag;
    recovering the first processed slag from the first supernatant; and
    regenerating the first organic amine cation by the addition of a first precipitant to the first supernatant, wherein the first organic amine cation comprises carbon.

2. The method of claim 1, wherein pH during regeneration of the organic amine cation is less than about 7.

3. The method of claim 1, wherein pH during regeneration of the organic amine cation is greater than 6 and less than 7.

4. The method of claim 1, wherein the organic amine has a pKa between 8 and 14.

5. The method of claim 1, wherein the lixiviant is formed by adding an acid to the uncharged organic amine in the presence of the slag.

6. The method of claim 1, further comprising a step of using at least a portion of the regenerated organic amine cation to contact the slag.

7. The method of claim 1, wherein the first precipitant is carbon dioxide or carbonic acid.

8. The method of claim 1, wherein the step of regenerating the first organic amine cation further comprises precipitation of the first alkaline earth element.

9. The method of claim 1, wherein the slag further comprises a second alkaline earth element, and further comprising the steps of:
    contacting the first processed slag with a second lixiviant, the second lixiviant comprising a second organic amine cation and a second counterion;
    forming a second processed slag and a second supernatant comprising an uncharged second organic amine and a second complex comprising a second alkaline earth element cation and the second counterion, wherein the second processed slag has a reduced content of carbonate-forming metal relative the first processed slag;
    recovering the second processed slag from the second supernatant; and,
    regenerating the second organic amine cation by adding a second precipitant to the second supernatant.

10. The method of claim 9, wherein the first precipitant and the second precipitant are the same species.

11. A method for producing a processed slag, comprising:
    contacting a slag comprising a first alkaline earth element and a second alkaline earth element with a lixiviant, the lixiviant comprising a first organic amine cation, a second organic amine cation, and a counterion;
    forming a processed slag and a first supernatant comprising an uncharged first organic amine, an uncharged second organic amine, a first complex comprising a first alkaline earth metal cation and the counterion, and a second complex comprising a second alkaline earth metal cation and the counterion, wherein the processed slag has a reduced content of carbonate-forming metal relative to the slag;
    recovering the processed slag from the first supernatant;
    transferring the first alkaline earth metal cation from the first supernatant to form a second supernatant;
    transferring the second alkaline earth metal cation from the second supernatant and,
    regenerating the first organic amine cation and the second organic amine cation from the second supernatant,
    wherein the first organic amine cation is regenerated by the addition of a first precipitant.

12. The method of claim 11, wherein the first organic amine cation and the second organic amine cation are the same species.

13. The method of claim 11, wherein the first organic amine cation and the second organic amine cation are different species.

14. The method of claim 11, wherein the first alkaline earth element is precipitated from the first supernatant by the addition of the first precipitant.

15. The method of claim 11, wherein the second alkaline earth element is precipitated from the second supernatant by the addition of a second precipitant to the second supernatant.

16. The method of claim 15, wherein the second precipitant is $CO_2$ or carbonic acid.

* * * * *